July 22, 1969

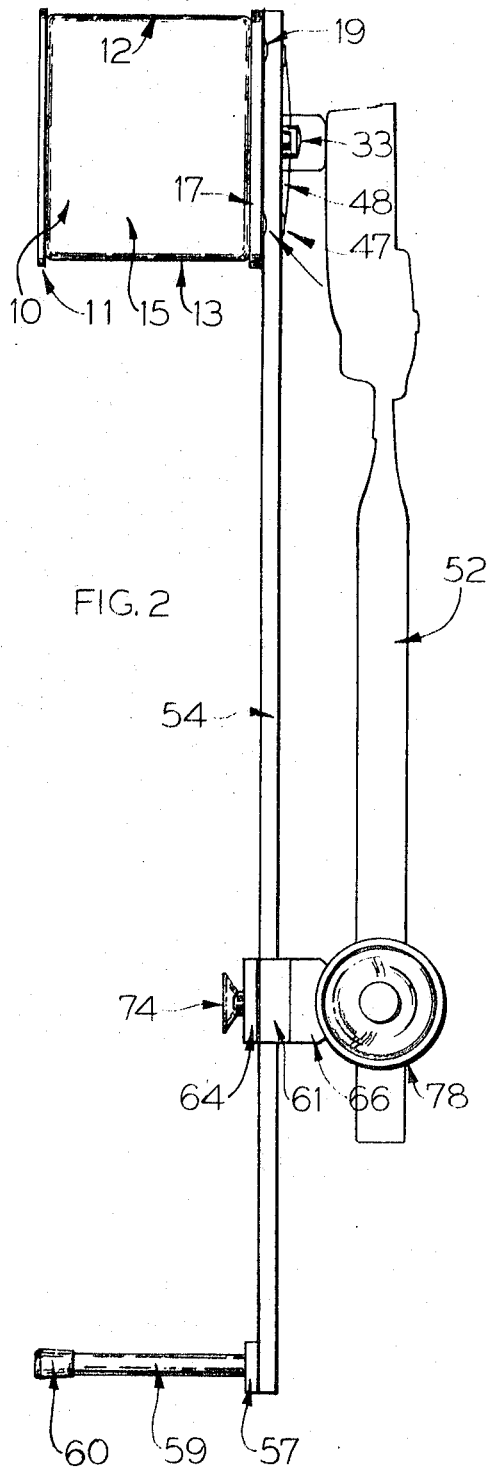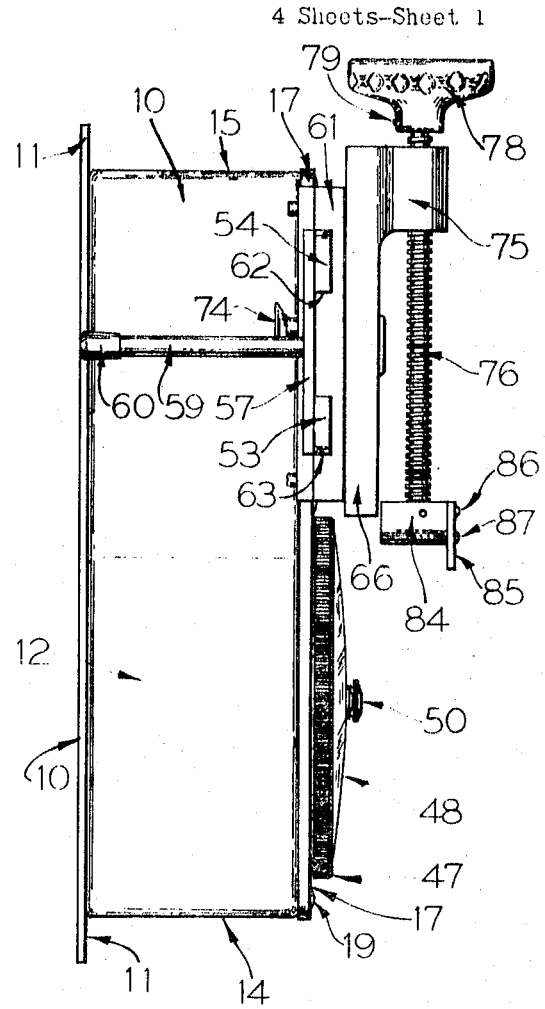

K. R. LARSON 3,456,485

TESTING DEVICE FOR TORQUE WRENCHES

Filed May 5, 1966

INVENTOR.
KENNETH R LARSON
BY
ATTORNEY

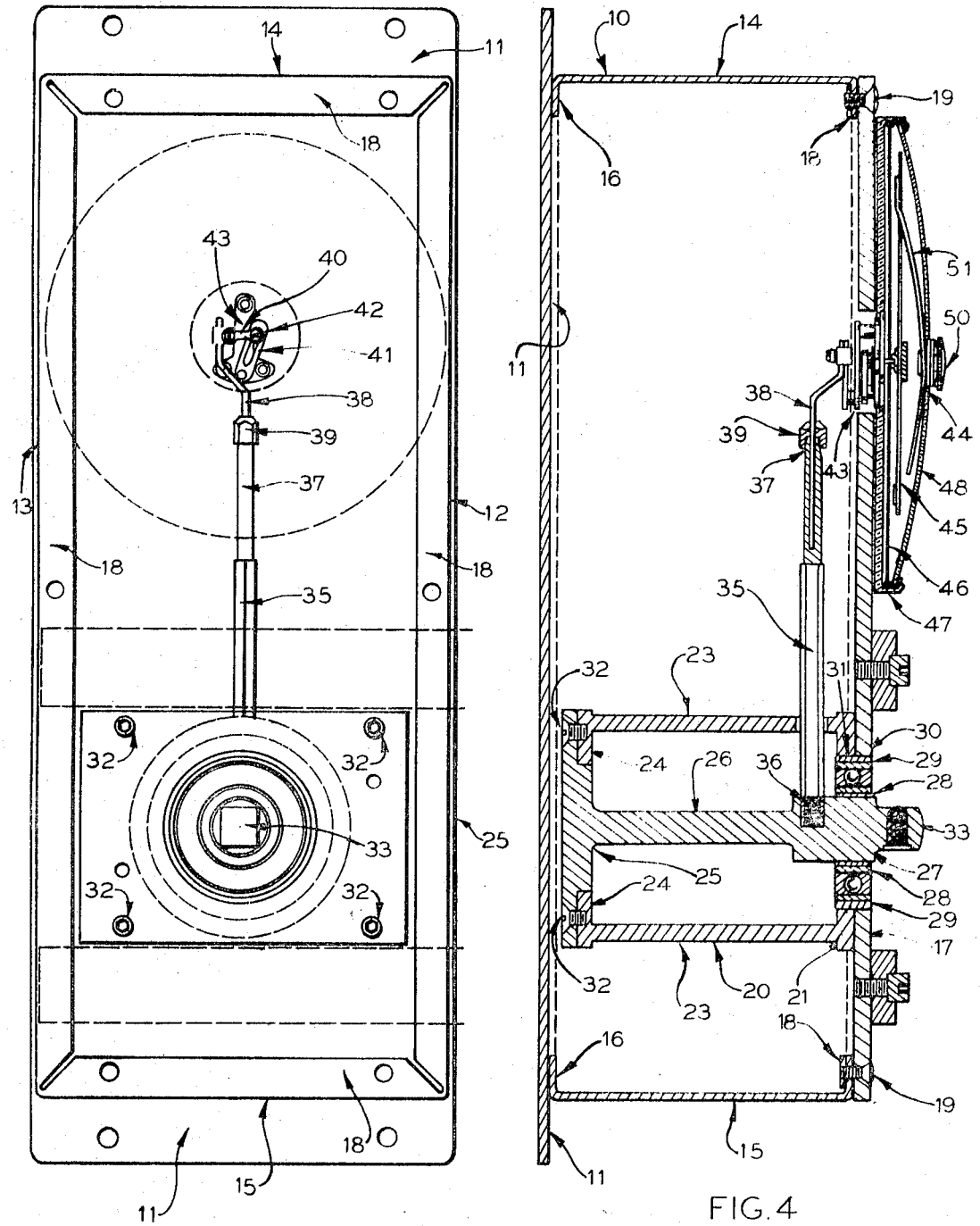

United States Patent Office 3,456,485
Patented July 22, 1969

3,456,485
TESTING DEVICE FOR TORQUE WRENCHES
Kenneth R. Larson, Des Plaines, Ill., assignor to Snap-On Tools Corporation, Kenosha, Wis., a corporation of Delaware
Continuation-in-part of application Ser. No. 152,969, Nov. 13, 1961. This application May 5, 1966, Ser. No. 547,984
Int. Cl. G01l 25/00
U.S. Cl. 73—1
2 Claims

ABSTRACT OF THE DISCLOSURE

A torque measuring device having a twistable shank with one end mounted within a housing the other end being adapted for connection to a torque wrench and extending out of the housing. Means connected to the housing are provided for applying a controlled torque to the wrench so that a reading on the torque wrench can be compared with that of an indication within the housing.

---

Figure 3:
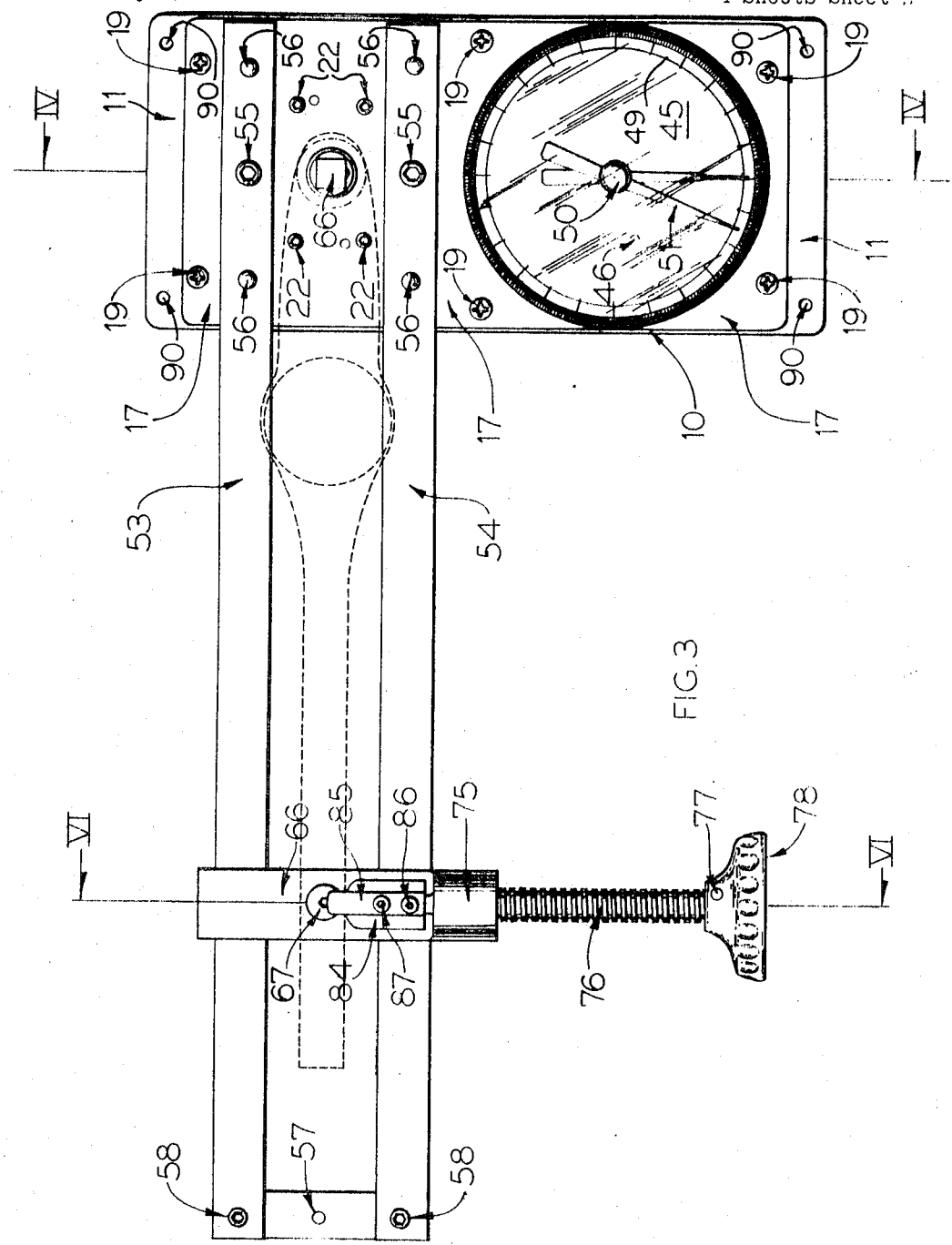

This invention relates to apparatus for testing and checking the accuracy of measuring devices and more particularly to torque wrench testing apparatus of the portable type, although it may be employed with equal advantage for other purposes. This application is a continuation-in-part of my copending application Ser. No. 152,969 and filed Nov. 13, 1961, now Patent No. 3,255,624.

It contemplates more especially the provision of instrumentalities in combination with an accurately calibrated meter comparable to the calibrated meter of a measuring device such as a torque wrench to respond upon mechanical actuation to the calibrated standard meter so that the load sustained by the device to be tested, will be translated thereto without introducing any inaccuracies in the translation or movement of the parts.

Most testing equipment is rather intricate precision apparatus which is exceedingly expensive in order to afford extreme accuracy or involve many parts which adds to the bulk and cost of production as well as render the transportation thereof cumbersome and expensive. In order to afford adequate testing of measuring devices such a torque wrenches in a factory or repair center where torque wrenches are used in large numbers as well as to enable the average users to test their own measuring tools, a portable, simple and comparatively inexpensive testing and checking device or apparatus has been provided which is compact, reliable, and readily adaptable for the on-the-spot testing of measuring instrumentalities. By adapting mechanical actuators for the device or devices to be tested and comparing readings thereon with the reading on an accurate built-in measuring device to which the measured load is translated, a fast and dependable check can be made by resort to an improved, comparatively simple, compact, and portable checking apparatus embodying features of the present invention.

One object of the present invention is to provide a more simple and compact testing apparatus for checking the accuracy of measuring devices such as torque wrenches used in increasing numbers in machine shops, repair centers, and on production lines.

Another object is to provide a new and novel load translating device which is compact, simple, and comparable in operation to the device to be tested therewith for accurate comparison of the calibrated meters therein.

Still another object is to provide a simple, compact and portable testing apparatus with a built-in calibrated and protected meter having the instrumentalities for translating a test load thereto for comparison with the measuring instrument meter, thereby affording a fast and dependable check thereof.

A further object is to provide a simple, compact, and readily portable testing device for torque measuring wrenches so that the latter may impart a measured load thereto for comparative metering of the results.

A still further object is to provide a simple, dependable and compact testing device for torque wrenches and the like which translate the load impart thereto for registry with a built-in similarly calibrated meter to check the accuracy thereof and enable prompt adjustment in the event of any variations therebetween.

Still a further object is to provide a simple, compact, durable and accurate turning load tester which will register a comparable value thereto and afford a comparison with the measuring instrument meter for prompt adjustment of any variation therebetween.

Other objects and advantages will appear from the following description of an illustrated embodiment of the present invention.

Figure 6:
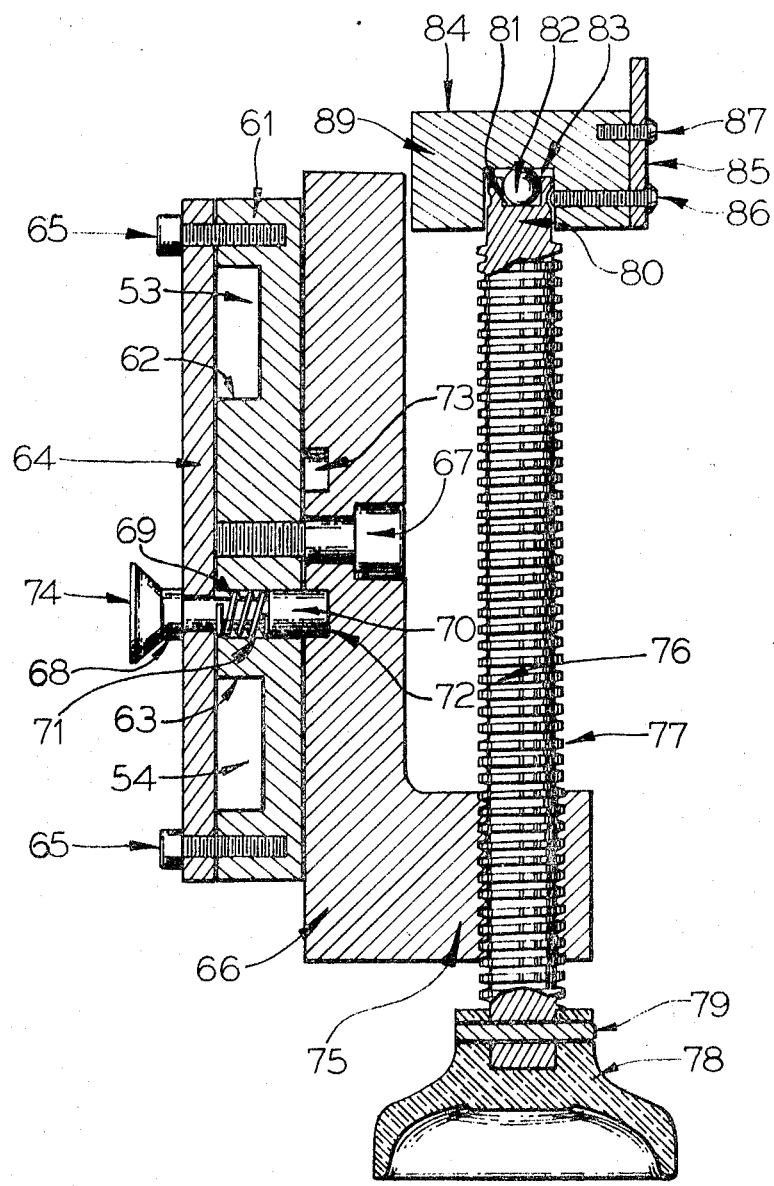

In the drawings:
FIGURE 1 is an end view in elevation of a device embodying features of the present invention.
FIGURE 2 is a rear view in elevation of the device illustrated in FIGURE 1.
FIGURE 3 is a plan view of the testing device shown in FIGURES 1 and 2.
FIGURE 4 is an enlarged sectional view in elevation taken substantially along line IV—IV of FIGURE 3.
FIGURE 5 is a plan view of the device portion shown in FIGURE 4 with the calibrated meter dial removed to clarify the showing of the moving parts thereof.
FIGURE 6 is an enlarged sectional view in elevation of the mechanism for imparting a load to the torque wrench under test, and taken substantially along line VI—VI of FIGURE 3.

The structure selected for illustration is not intended to serve as a limitation upon the scope or teachings of the invention, but is merely illustrative thereof. There may be considerable variations and adaptations of all or part of the teachings thereof depending upon the dictates of commercial practice. The present invention comprises a measuring housing 10 (FIGURES 3, 4 and 5) involving an elongated substantially rectangular base plate 11 that is somewhat longer than the housing side walls 12–13 having end walls 14–15 flanged at their lower edges as at 16 for welded connection to the base plate 11. A substantially thicker steel plate 17 is mounted above the housing walls 12–13–14–15 for attachment to their peripheral top flanges 18 by means of suitable screw fasteners 19, in this instance six, which hold the heavy plate 17 fast on the housing wall peripheral flanges 18 as a part thereof.

In order to provide for the registry of a torque measuring wrench with the testing instrumentalities to be presently described, the heavy steel plate 17 is fitted with an inernal depending steel cage 20 consisting, in this instance, of a top plate 21 of rectangular shape which is anchored to the housing plate 17 by threaded studs 22, in this instance four, projecting therethrough to engage the cage top plate 21 for attachment therebetween. The cage sides 23 (FIGURE 4) terminate in flanged peripheral bottom edges 24 within the housing 10 and short of the base plate 11 thereof, to receive a complemental base plate 25 comprising an integral part of a cylindrical upstanding and elongated shank 26 having a somewhat enlarged hub 27 journalled in ball bearing raceways 28–29 press-fitted in a proper sized bore consisting of aligned apertures 30–31 provided in the housing top plate 17 and the cage top plate 21 which confront each other and are attached together by the threaded fasteners 19, supra.

The base plate 25 of the elongated shank 26, is in turn complemental to the peripheral bottom flange 24 of the cage 20 for attachment thereto by means of screw fasteners 32. It should be noted that the shank hub 27 terminates upwardly in a projecting polygonal work engaging integral shoulder 33 preferably provided with a spring impelled ball detent 34 of standard construction, to frictionally receive suitable adapters thereon such as wrench sockets to provide for registry of a torque wrench therewith for imparting a turning load thereto. The impression of a turning load on the work engaging member 33 will impart a minimal twist to the anchored shank 26 proportional to the load, and this twist is translated to a calibrated meter for accurately measuring the load thereon by means of a tubular arm 35 threaded as at 36 to radially extend from the shank hub 27. A rod-like slitted and tapered threaded clutching member 37 extends freely within the tubular arm 35, it securely and frictionally holding a solid wire 38 through the clutching exerted by a tapered nut 39 that engages the correspondingly tapered clutching member 37 to adjustably retain a fixed relationship between the rod 38 and the clutching member 37 together with the parts related thereto.

The rod 38 is suitably articulated to engage a meter link 40 which operatively connects with an elongagted slot 41 provided in an arm 42 (FIGURE 5) comprising part of the meter mechanism 43 (FIGURE 4) of standard construction which rotates the meter pin 44 which carries the pointer 45 in confronting relation to a calibrated dial 46. The dial 46 is positioned in a circular meter casing 47 carrying a transparent enclosure 48 for viewing the pointer 45 in relation to the calibrations 49 on the dial 46. In this particular embodiment, the concave transparent enclosure 48 is fitted with an axial diminutive knob 50 journalled in the transparent enclosure 48 for connection with a concavely bowed resetting pointer 51 whose end is disposed below the plane of the regular pointer 45 for sweeping engagement therewith to enable the poinnter 45 to be re-positioned by manipulating the finger grasping knob 50 to initially reset the pointers and bring the regular pointer 45 to its initial reading which is usually zero (0) graduation on the dial 46. To this end, the pointer 45 is frictionally mounted on the meter pin 44 to permit this initial positioning without disturbing the meter actuating linkage described supra.

It should be noted that if the torque wrench 52 in operative position and connected to the work engaging head 33 (FIGURE 2), is turned to impress a load upon itself which measures say fifty foot pounds on its own meter, then the tester meter 45–46–48 would also show fifty foot pounds in the event the torque wrench is registering accurately. Otherwise, there would be a divergence between the readings of the two meters, and one could be adjusted to correspond with the other. Ordinarily, the tester meter 45–46–48 would be accurately calibrated and so maintained in that it is not abused like a wrench and is more or less protected by its sturdier construction and mounting compared to a wrench meter which is always subject to abuse, bumps, impacts, and movement in relation with other tools and devices. It should be observed, however, that instrumentalities are provided to mechanically rather than manually impart a turning movement to the torque wrenches 52 applied to the tester work engaging member 33. To this end, the top plate 17 of the tester housing 10 are fitted with parallel spaced extension guide bars 53–54, in this instance two, which are anchored to the top plate 17 by means of threaded studs 55 which are reinforced by means of aligning pins 56 to preclude any relative movement between the guide bars 53–54 in relation to each other and also relative to the housing top plate 17. The parallel spaced guide bars 53–54 terminate at their free ends in a cross-bar 57 (FIGURE 3) which is connected thereto by means of threaded machine screws 58.

So that the guide bars 53–54 will be suitably supported in a horizontal plane determined by its support on the housing top plate 17, a standard 59 constituting a vertical rod with a rubber or plastic castor foot (FIGURE 2) is attached to the midpoint of the cross-bar 57 as at 58 to elevate the cross-bar ends and maintain them in the horizontal plane of the housing top plate 17 without any detrimental yield due to the load or weight of the cross-bars 53–54. The latter support and guide a cross carriage 61 (FIGURES 1 and 6) having slots 62–63 therein to freely receive the cross-bars 53–54 for slidable displacement therealong. A bottom plate 64 is applied to the cross-carriage 61 by machine screws 65 to retain the cross-carriage in slidable relation with the cross-bars 53–54, and the cross-carriage 61 mounts a carrier arm 66 which has a pivotal screw connector 67 extending therethrough to engage and anchor in the cross-carriage 61 to establish a relative rotary relationship therebetween as will appear more fully hereinafter.

In order to index the carrier arm 66 for 180 degree alignment with the cross-carriage 61 in one of two opposite positions, an indexing pin 68 is spring mounted as at 69 to urge a cylindrical button head 70 along a bore 71 in and through the cross-carriage 61 (FIGURE 6). The button head 70 registers with either a complemental recess 72 or 73 equidistantly spaced in the bottom of the cross-carriage carrier arm 66 so that the latter may be held in alignment with the cross-carriage 61 to engage the torque wrench handle 52 (FIGURE 2) in one of two opposite positions for imparting a turning load in a clockwise or counterclockwise direction to test such in both a tightening or loosening operation in relation to a nut or other fastener (viewed from FIGURE 3). It should be observed that the button head 70 of the indexing pin 68 is withdrawn against the urge of the spring 69 by means of a finger grasping knob 74 attached to the pin 68 and affording the ready indexing of the carrier arm 66.

As shown, the carrier arm 66 (FIGURE 6) is provided with an integral upstanding arm 75 through which an elongated threaded shank 76 extends to provide a durable threaded connection therebetween, in this instance through the medium of a square-cut Acme type thread 77. A hand grasping enlarged knob 78 is physically connected to the end of the threaded shank 76 by means of a cross-pin 79 to turn the threaded shank 76 manually in one direction or another to displace the threaded shank 76 longitudinally in or out depending upon the load to be applied to the handle of the torque wrench 52. The threaded shank 76 terminates in a reduced extremity 80 which is end recessed as at 81 to receive a ball bearing 82 that abuts against the bottom of a recess 83 provided in a confronting face of an engaging member block 84. The engaging block 84 is provided with an overhanging plate 85 that serves to retain the wrench handle 52' in frictional contact with the end block 84. Threaded screws 86–87 extend through the overhanging and projecting plate 85, and it should be noted that the screw 86 is sufficiently long to register with an annular groove 89 in the shank extremity 80 to retain it in operative connection with the engaging end block 84 while permitting relative rotation therebetween.

With this arrangement and the provision of the threaded shank 76 on the carrier arm 66, the handle end 52' of the torque wrench 52, is engaged by the end block 84 with the plate 85 projecting thereover to enable any load within the capacity of the torque wrench to be tested, to be impressed therewith and held mechanically until the comparison is made between the torque wrench meter and the testing meter 47–48 and adjustment effected in the wrench meter connections. It will be apparent from the foregoing description and illustration of a preferred embodiment of the invention, that a very simple and effective measuring instrument tester has been provided that is compact, simple, versatile, and dependable over a wide range of capacities for bench use by mechanics and others. Should it be desired to attach the tester housing 10 to a bench or other support, apertures 90 are provided in its bottom plate 11 for that purpose; however, this is within the discretion of the user and the individual requirements of any particular installation.

While I have illustrated and described a preferred embodiment of my invention, it must be understood that my invention is capable of considerable variation and modification without departing from the spirit of the invention. I, therefore, do not wish to be limited to the precise details of construction set forth, but desired to avail myself of such variations and modifications as come within the scope of the appended claims.

I claim:

1. In a checking and testing device, the combination with a housing, of a calibrated measuring instrumentality rigidly mounted in said housing for exterior viewing, torque resisting means comprising a torsion shank anchored in said housing to develop a measureable yield responsive to a turning load applied thereto, twist translating means for operatively connecting said torque resisting torsion shank means to said calibrated measuring instrumentality, a work engaging member extending from said torsion shank and journalled proximate thereto in said housing for support and response to said torque resisting means, said work engaging member being adapted to detachably receive a measuring device to impart a turning movement to said torque resisting torsion shank means for an extent indicated by its own measuring instrumentality, carriage sliding guides on said housing, a carriage mounted in said sliding guides, a cross-carriage mounted on said first named carriage to impress a load on a measuring device applied to said work engaging member, pivotal means for mounting said cross-carriage to said slidable carriage, and indexing means interposed between said slidable and cross-carriages to maintain said cross-carriage in one of two diametrically opposite positions on said slidable carriage for impressing a tightening or loosening test load on the measuring device applied to said work engaging member, whereby comparable readings on said housing calibrated measuring instrumentality and said measuring device applied to said work engaging member will determine the accuracy of the latter relative to the former.

2. In a checking and testing device defined in claim 1 wherein screw displacing means are provided on said cross-carriage to mechanically impress a load on the measuring device applied to said work engaging member.

References Cited

UNITED STATES PATENTS

| 3,079,785 | 3/1963 | Livermont. |
| 2,342,919 | 2/1944 | Chapman. |
| 2,703,976 | 3/1955 | Livermont. |

S. CLEMENT SWISHER, Primary Examiner

U.S. Cl. X.R.

73—134